United States Patent
Reynolds et al.

(10) Patent No.: US 8,032,130 B2
(45) Date of Patent: Oct. 4, 2011

(54) SYSTEMS AND METHODS OF CONTROLLING ONE OR MORE CHARACTERISTICS OF A SERVICE

(75) Inventors: Paul Laurence Reynolds, Bristol (GB); Alan George Stidwell, Bristol (GB)

(73) Assignee: Orange SA (GB)

( * ) Notice: Subject to any disclaimer, the term of this patent is extended or adjusted under 35 U.S.C. 154(b) by 807 days.

(21) Appl. No.: 11/723,564

(22) Filed: Mar. 20, 2007

(65) Prior Publication Data

US 2007/0237103 A1    Oct. 11, 2007

Related U.S. Application Data

(63) Continuation of application No. PCT/GB2005/003651, filed on Sep. 22, 2005.

(30) Foreign Application Priority Data

Sep. 22, 2004   (GB) .................................. 0421114.0

(51) Int. Cl.
*H04W 24/00* (2009.01)
*H04W 72/00* (2009.01)

(52) U.S. Cl. ..................................... 455/423; 455/452.2
(58) Field of Classification Search .................. 455/423, 455/452.2

See application file for complete search history.

(56) References Cited

U.S. PATENT DOCUMENTS

| | | | |
|---|---|---|---|
| 5,918,002 A * | 6/1999 | Klemets et al. | 714/18 |
| 6,614,763 B1 * | 9/2003 | Kikuchi et al. | 370/252 |
| 6,760,344 B2 | 7/2004 | Mizell et al. | |
| 7,032,020 B2 * | 4/2006 | Gross | 709/224 |
| 2001/0005360 A1 | 6/2001 | Lee et al. | |
| 2002/0044528 A1 | 4/2002 | Pogrebinsky et al. | |
| 2003/0053419 A1 * | 3/2003 | Kanazawa et al. | 370/252 |
| 2003/0157934 A1 | 8/2003 | Liang et al. | |
| 2004/0057420 A1 * | 3/2004 | Curcio et al. | 370/352 |
| 2004/0058652 A1 * | 3/2004 | McGregor et al. | 455/67.13 |
| 2006/0099952 A1 * | 5/2006 | Prehofer | 455/440 |

FOREIGN PATENT DOCUMENTS

GB   2370200   6/2002

(Continued)

OTHER PUBLICATIONS

International Search Report.

(Continued)

*Primary Examiner* — Marisol Figueroa
(74) *Attorney, Agent, or Firm* — Knobbe Martens Olson & Bear, LLP (57) ABSTRACT

The invention relates to a method and apparatus for controlling one or more characteristics of a service received by a mobile station in a mobile communications network across a radio communications link with a dynamically varying bandwidth. Bandwidth-sensing data packets are created for the purpose of determining changes in the bandwidth available across the link and transmissions of bandwidth-sensing data packets across the link are monitored. If timing information generated from the monitored transmissions indicates a change in the bandwidth, then one or more characteristics of the service received can be altered. With this new measure of the available bandwidth, the service received by a mobile station can be managed more intelligently, for example by instructing a bandwidth control function to alter the bandwidth available across the link, by instructing a handover control function to control a handover of the link from one fixed node to another fixed node, or by altering a data rate of the service data packets.

35 Claims, 5 Drawing Sheets

FOREIGN PATENT DOCUMENTS

| | | |
|---|---|---|
| WO | WO 02/37969 A1 | 5/2002 |
| WO | WO 02/093866 A2 | 11/2002 |
| WO | WO 2004/010648 A1 | 1/2004 |
| WO | WO 2004/072829 A | 8/2004 |

OTHER PUBLICATIONS

International Preliminary Report on Patentability.
Great Britain Search Report for GB0421114.0 dated Feb. 22, 2005.

* cited by examiner

SYSTEMS AND METHODS OF CONTROLLING ONE OR MORE CHARACTERISTICS OF A SERVICE

CROSS-REFERENCE TO RELATED APPLICATIONS

This application is a continuation, under 35 U.S.C. §120, of International Patent Application No. PCT/GB2005/003651, filed on Sep. 22, 2005 under the Patent Cooperation Treaty (PCT), which was published by the International Bureau in English on Mar. 30, 2006, with International Publication Number WO/2006/032890, which designates the United States and claims the benefit of GB Application No. 0421114.0, filed on Sep. 22, 2004. All above-referenced prior applications are incorporated by reference herein in their entirety, and are hereby made a portion of this specification.

BACKGROUND OF THE INVENTION

1. Field of the Invention

This invention relates to a method for controlling one or more characteristics of a service received by a mobile station in a mobile communications network across a radio communications link with a dynamically varying bandwidth.

2. Description of the Related Technology

Current mobile communication networks have the capability to carry different types of payload. These payloads may for example comprise voice traffic, video traffic or other types of service data. One such mobile communication network is the Global System for Mobile communication (GSM) network, which employs Time Division Multiple Access (TDMA) techniques to transmit information by dividing frequency channels into a number of different time slots.

GSM is a second generation system which uses circuit-switched technology to carry speech information, but also incorporates a radio access packet data facility known as the General Packet Radio Service (GPRS). This gives the capability to carry data traffic using packet-switched technology with the option to be always connected to the data network. GPRS is also available in third generation systems.

In such a network, it is usual to only allocate one time slot in a cell to packet-only services with the remaining time slots (seven in GPRS) being made available as and when they not carrying voice traffic. Further, the number of mobile stations using GPRS in a cell also varies. Hence, the available GPRS bandwidth to a mobile station has a time variant and unpredictable characteristic. This is compounded on a handover event when the receiving cell may have a different number of available time slots. No mechanism exists in current architectures such as GPRS to make the number of time slots being used to be made available to either the mobile station or application, a situation made worse on handover where a prior knowledge of the receiving base station's available capacity is not known. It can be argued that this is not a significant drawback as packet traffic is best effort and changes in available bandwidth will be accommodated by store forward techniques. However, best effort means no quality control. Future releases of GPRS will support Quality of Service (QoS) with "guaranteed" bandwidth allocation. However, if upon handover the receiving cell does not have the number of time slots available to guarantee the bandwidth, the call is dropped.

A method for broadcasting data packets in a data packet communication system is described in UK Patent Application GB A 2 370 200. An enhancer is inserted into a communication link. It sends spoof acknowledgments to an upstream unit, which perceives that the acknowledgments have come from a downstream unit. The enhancer measures efficacy of operation of the downstream units (the transmission quality) by monitoring the round trip time (RTT) or/and the amount of unacknowledged data sent to the downstream units. It uses the measurements to control the data flow sent to the downstream units. The method is only suitable for the broadcast of data packets and requires acknowledgement by the mobile stations of all data packets broadcast by the enhancer, which produce an undesirable amount of loading over the radio interface. Further, the method requires monitoring of large amounts of data being sent to determine the transmission quality.

A system for transcoding multimedia information within a network communication system is described in International Patent Application WO A 02/093866. Multimedia information communicated between a transmitter and a receiver may be transcoded by intercepting the multimedia information within a network communication system. The available transmission rate of the downlink channel may be estimated by, for example, calculating a ratio of the smoothed round trip time of packets communicated to the receiver and a smoothed congestion window associated with the downlink channel. If the transmission rate at which the multimedia information is encoded is greater than the available transmission rate, the multimedia information may be transcoded to conform the multimedia information to the available transmission rate. Again, the system is suitable only for broadcast information, and further, large amounts of multimedia information needs to be monitored in order to determine the available transmission rate. A method for measuring the QoS at the application level in a mobile packet-based telecommunications network is detailed in International Patent Application WO A 04/010648. Data indicating the behavior of the network is measured and stored at a number of points across the network and used to indicate the emergence of a critical situation where QoS could be compromised. If such a situation arises a trigger signal is sent to a central node where attempts can be made to alleviate the situation to keep the QoS up to an acceptable level.

In U.S. Pat. No. 6,760,344 different logical link identifier values are assigned by a Serving GPRS Support Node (SGSN) to mobile stations which reflect their QoS ratings. The values can then be evaluated by a base station and used to allocate network resources in order to maintain as high a level of QoS as possible.

One attribute defined in the GPRS standard is the mean, data rate for a Packet Data Protocol (PDP) context, which may be calculated over the entire time an Internet Protocol (IP) address is allocated to a mobile station. This time may be up to several days, so may not give an accurate measure for the time that the mobile station is actually active. Various new parameters are introduced in International Patent Application WO A 02/39769 in an attempt to improve the level of QoS available. The idle capacity is allocated to counteract the mean data rate dropping below an acceptable level by investigating whether the parameters would be affected by differing allocation of resources. If the differing allocation within the cell, such as allocating resources to a new mobile station or a handover event, would cause the parameters to indicate that the QoS level for the mobile station in question would be lost, then such allocation changes are rejected. In inter-technology handover schemes like Internet Protocol Mobility Management (IPMM), the disparate nature of the access technology bandwidths can have a serious effect on the service provided to the mobile station, which may have only temporary effect or may be longer-term.

It would be desirable to provide ways to ameliorate the above problems.

SUMMARY OF CERTAIN INVENTIVE ASPECTS

According to a first aspect of the present invention, a method is introduced for controlling one or more characteristics of a service received by a mobile station in a mobile communications network across a radio communications link with a dynamically varying bandwidth, the service comprising service data packets being sent from and/or to the mobile station, the method comprising the steps of: creating bandwidth-sensing data packets, the bandwidth-sensing data packets being created for the purpose of determining changes in the bandwidth available across the link; monitoring transmissions of the bandwidth-sensing data packets across the link, the monitored transmissions including at least the transmission of a given bandwidth-sensing data packet; generating timing information for the monitored transmissions; and in response to the timing information indicating a change in the bandwidth, altering one or more characteristics of the service received in the mobile communications network.

Hence, by use of the present invention, a service received by a mobile station across a radio communications link can be altered in response to timing information obtained from the transmission of bandwidth-sensing data packets across the link. The bandwidth-sensing data packets are created specifically for the purpose of determining changes in the bandwidth available across the radio communications link, as opposed to service data packets which carry the payload of the service.

Preferably, the bandwidth-sensing data packets are sent using a higher priority than the service data packets. Using a high priority protocol is advantageous in that the bandwidth-sensing data packets can be treated differently from the service data packets, in order to enable or enhance their bandwidth-sensing function. Furthermore, a more accurate estimate of the bandwidth available can be produced without the need to analyze a large sample of the service data packets. In preferred embodiments of the invention, the bandwidth-sensing data packets include bandwidth-sensing data packets sent from an originating node to the mobile station. Preferably, the bandwidth-sensing data packets which are sent to the mobile station are created in a different originating node than service data packets which are sent to the mobile station. Hence, the bandwidth-sensing function can be used independently of the service being provided.

In preferred embodiments of the invention, the bandwidth-sensing data packets include bandwidth-sensing data packets sent from the mobile station. Preferably, the bandwidth-sensing data packets which are sent from the mobile station are sent to a different destination node than the service data packets which are sent from the mobile station. The destination node can then process the bandwidth-sensing data packets separately from the service data packets.

Preferably, the timing information would be used to calculate a transit delay for a packet over the link. The transit delay could, for example, be converted into an estimate of the bandwidth currently available across the link. Depending on this bandwidth estimate, the service can be adjusted to deliver an acceptable level of QoS.

Embodiments of the invention allow more intelligent bandwidth management as both the mobile station and application (i.e. client and server) can be made aware of bandwidth availability. One way in which this new information can be exploited is by carrying out transcoding of the application such that the service can be maintained albeit in a different form. This form could be an agreed degradation of the service, for example high data rate video degrading to low data rate video. The new information could also be used to initiate a request for a certain level of service to be maintained, for example by requesting more resources to be allocated to the current radio link or by handover to a different link with the required level of resources available. Embodiments of the invention involve the use of existing transaction based protocols with a view to the identification of available bandwidth on a radio communications link.

In an embodiment of the invention, the radio communications link is a GPRS communications link. The invention can be used to give information that is unavailable using the existing GPRS technology.

According to a second aspect of the present invention, a mobile station is adapted to perform the creation of the bandwidth-sensing data packets and/or the monitoring of transmissions of the bandwidth-sensing data packets across the link and/or the generation of timing information for the monitored transmissions.

According to a third aspect of the present invention, an apparatus for use in a fixed node is adapted to perform the creation of the bandwidth-sensing data packets and/or the monitoring of transmissions of the bandwidth-sensing data packets across the link and/or the generation of timing information for the monitored transmissions.

According to a fourth aspect of the present invention, an apparatus for use in a control node is adapted to perform the monitoring of transmissions of the bandwidth-sensing data packets across the link and/or the generation of timing information for the monitored transmissions and/or the alteration of the one or more characteristics of the service received in the mobile communications network.

According to a fifth aspect of the present invention, computer software for use in a fixed node is adapted to perform the creation of the bandwidth-sensing data packets and/or the monitoring of transmissions of the bandwidth-sensing data packets across the link and/or the generation of timing information for the monitored transmissions.

According to a sixth aspect of the present invention, computer software for use in a computer control node is adapted to perform the monitoring of transmissions of the bandwidth-sensing data packets across the link and/or the generation of timing information for the monitored transmissions and/or the alteration of the one or more characteristics of the service received in the mobile communications network.

In accordance with a seventh aspect of the present invention, a method is introduced for controlling one or more characteristics of a service received by a mobile station in a mobile communications network across a radio communications link with a dynamically varying bandwidth, the method comprising the steps of: monitoring transmissions of data packets across the link, the monitored transmissions including at least the transmission of a given data packet; generating timing information for the monitored transmissions; and in response to the timing information indicating a change in the bandwidth, altering one or more characteristics of the service received in the mobile communications network, wherein the service is provided at least in part by one or more radio resource control functions and the alteration involves altering radio resources in the service received by the mobile station, under the control of the one or more radio resource control functions.

Advantageously, when the timing information indicates that there has been a change in the available bandwidth, the radio resource control function can be employed to directly alter the radio resources available to the mobile station, and thereby improve the service provided.

The alteration could involve instructing a bandwidth control function to alter the bandwidth available across the link or instructing a handover control function to control a handover of the radio communications link from one fixed node to another fixed node.

DETAILED DESCRIPTION OF CERTAIN INVENTIVE EMBODIMENTS

Figure 1:
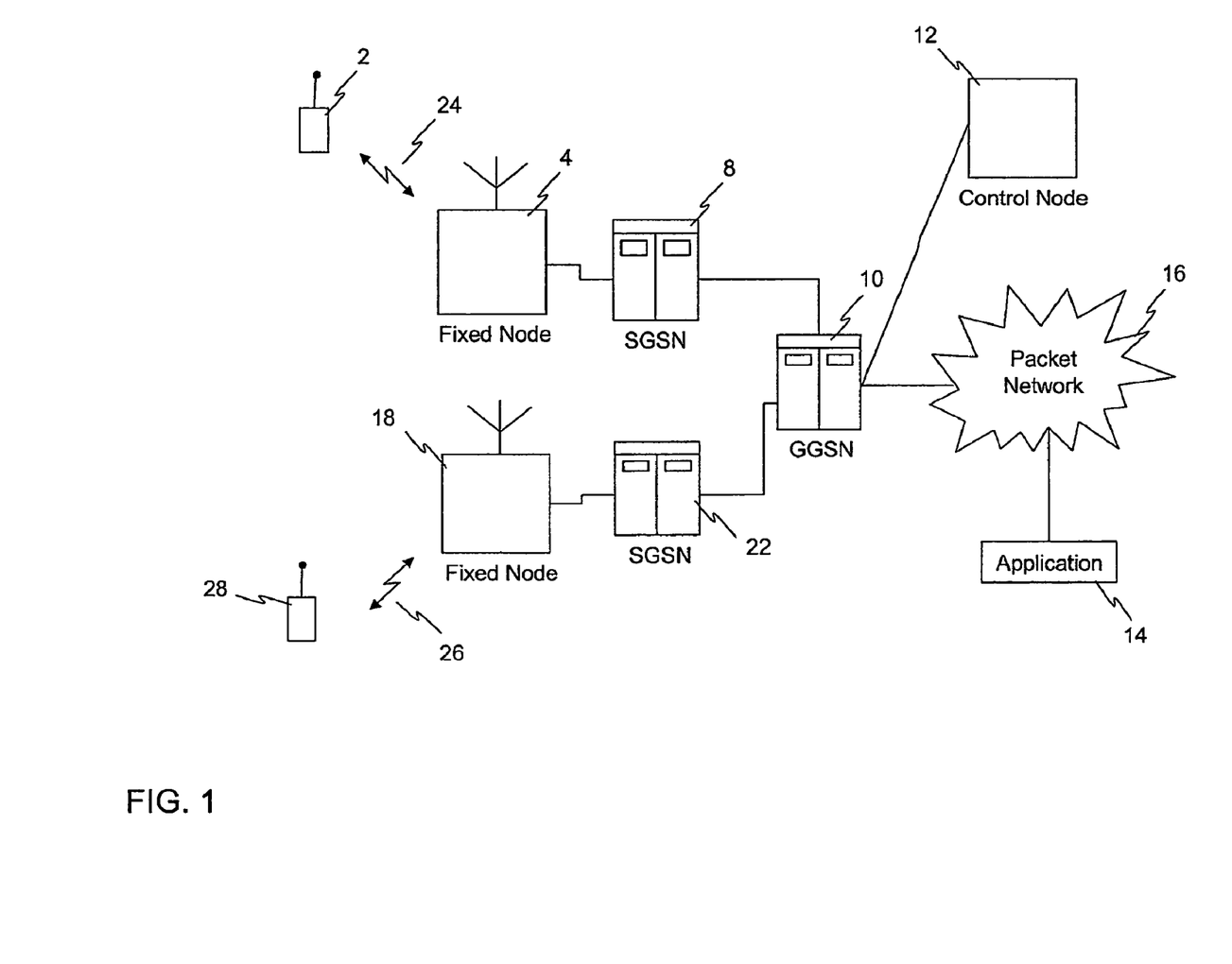
FIG. 1 is a system diagram of a mobile communications network arranged in accordance with an embodiment of the present invention.

FIG. 1 is a system diagram of a GSM-type mobile communications network arranged in accordance with an embodiment of the present invention. The network contains packet-orientated network infrastructure including GPRS support nodes, one or more serving GPRS support nodes (SGSNs) 8, 22 and a gateway GPRS support node (GGSN) 10 interconnected by a GPRS backbone network. The GGSN 10 routes data packets to and from an application 14 running on a packet data network (PDN) network 16, using a protocol such as TCP/IP or X.25. It contains routing information for active GPRS users in the network, which is used to transmit data packets to the current point of attachment of a mobile station in the network from the packet data network. The GGSN 10 provides a mapping function for mapping a packet data protocol (PDP) address, whereby a mobile user is identified in the packet data network, to a mobile station identity, whereby the mobile user is identified in the network. The PDP address of a mobile user conforms with the standard addressing scheme of the respective network layer service used in the packet data network, for example an IP version 4 address, an IP version 6 address or an X.121 address. The SGSNs 8, 22 are referred to as serving GPRS support nodes, in that these nodes are those which serve mobile stations 2, 28 in their routing areas. On logon to the GPRS service of a mobile station, the SGSN 8, 22 establishes a mobility management context containing information pertaining to mobility and security for the mobile station. The SGSN 8, 22 also establishes a routing context, referred to in GPRS as a "PDP context", with the GGSN 10 to be used by the mobile station 2, 28 to access the application 14 via the packet data network 16.

The network also includes a mobile switching centre (MSC), not illustrated here, which is connected via a communications link to the fixed nodes 4, 18. The MSC is connected via communications links to other mobile switching centers in the remainder of the mobile communications network, and to other networks such as the public switched telephone network (PSTN), also not illustrated. The fixed nodes 4, 18 are dispersed geographically across areas served by the MSC. These fixed nodes are base stations as known in the art, yet adapted to incorporate the present invention. Each fixed node 4, 18 transmits radio signals to, and receives radio signals from, mobile stations which are in an area known as a cell served by that fixed node. In the example shown in FIG. 1, a mobile station 2 is operated in one cell and is served by one fixed node 4, and a mobile station 28 is operated in another cell and is served by another fixed node 18. A GSM network is provided with a large number of cells, which are ideally contiguous to provide continuous coverage over the whole network territory. The mobile stations 2, 28 contain GPRS modules, which include packetizers, depacketisers and buffer stores. These modules enable them to transmit and receive packet mode data. For example, a mobile user may use a mobile station 2, 28 in order to access Web pages on the public Internet, using terminal equipment attached to the mobile station. This access could occur via the gateway functionality provided by the GGSN 10 and the packet mode transfer functionality provided in the remainder of the network including the SGSNs 8, 22, the fixed nodes 4, 18 and the GPRS radio interface, shown by radio links 24 and 26.

The elements in the diagram described thus far are known in the art. The present invention involves the addition of a control node 12, which communicates with the GGSN or other such network node via a communications link.

The control node 12 is an entity in the network that is made responsible for keeping a record of bandwidth availability for active mobile stations in the network. The purpose of this new entity is to collect bandwidth reports, analyze these reports and conduct service management accordingly.

Bandwidth-Sensing Mechanism

A bandwidth-sensing mechanism is used in embodiments of the present invention in order to identify the bandwidth currently available over a radio access link. The mechanism is carried out using bandwidth-sensing data packets and may include one or more bandwidth-sensing requests, bandwidth-sensing responses and corresponding bandwidth reports. The bandwidth-sensing mechanism can be facilitated by existing transaction based protocols for example, the Internet Control Message Protocol (ICMP) echo mechanism (also known as the PING facility).

ICMP allows the sending of a simple IP packet of four bytes in addition to the IP packet header to an addressed remote node and have it echoed back (the ICMP ECHO_REQUEST packet). The remote node or bandwidth-sensing responder runs at a high priority, for example in the kernel of the operating system, so that the round trip delay can be taken as a good measure of bandwidth between the sending and responding nodes. Using the terminal and fixed node as the sending and responding nodes, or vice versa, the round trip delay can be taken as a good measure of the bandwidth of the radio access link.

Note, however, the invention is not limited to the use of ICMP. Other protocols, and preferably those that are transaction based (i.e. each request is acknowledged) may be used e.g. the Transmission Control Protocol (TCP). However, it is preferred to use a protocol that is given priority in a Central Processing Unit (CPU) queuing system as any CPU delays are thus minimized.

With the round trip delay being indicative of bandwidth availability across the link, then the time of passage or a response time for a bandwidth-sensing request can be transmuted into a control function for reacting to changes in bandwidth. The architecture to support such an arrangement can take two forms, mobile station based monitoring or fixed node based monitoring, which are explained in the following sections.

Mobile Station Based Monitoring

Figure 2:
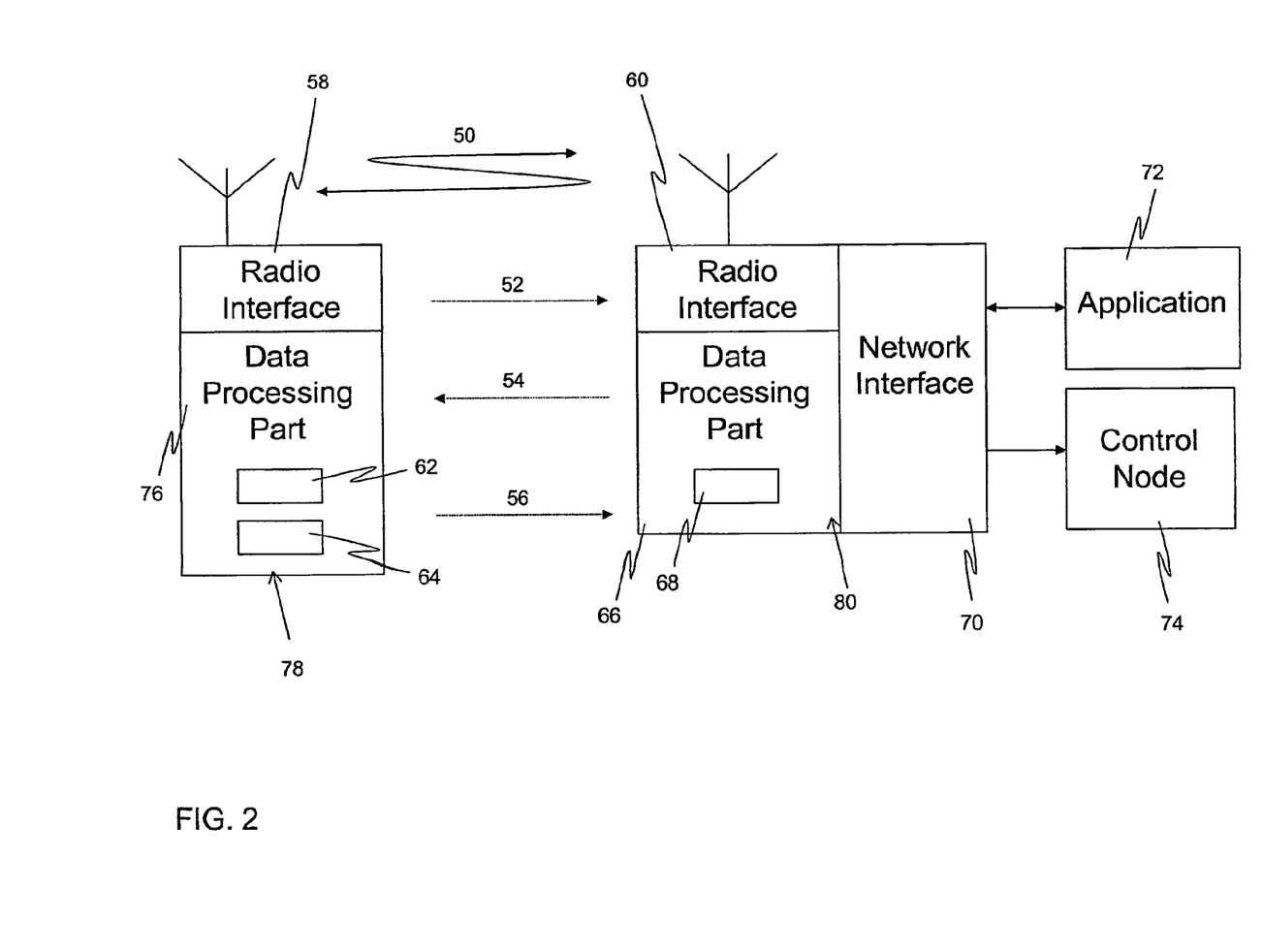
FIG. 2 is a diagram of the mobile station based monitoring configuration according to an embodiment of the invention.

In this embodiment each mobile station 2, 28 is adapted to make a bandwidth-sensing request to a bandwidth-sensing agent situated at the edge of the access network, for example the fixed nodes 4, 18. These requests may occur at regular intervals, in response to a particular usage pattern, when certain network conditions exist or other factors. FIG. 2 shows a schematic of this process, where a mobile station 78 with a radio interface 58 and a fixed node 80 with a radio interface 60 communicate via a radio link 50. The fixed node 80 has access to an application 72 via a network interface 70. The mobile station 78 incorporates an application 64 running in a data processing part 76. Service data packets are sent between the applications 64, 72.

A bandwidth-sensing request, shown as step 52, originating from a bandwidth-sensing agent 62 contained in a data processing part 76 of the mobile station 78 is transmitted via the radio interface 58 across the radio link 50 to an IP address associated with the fixed node 80. This bandwidth-sensing request 52 is received via the radio interface 60 in the fixed node 80 and passed to a data processing part 66 contained therein. The data processing part 66 in the fixed node 80 contains a bandwidth-sensing responder 68 which processes this bandwidth-sensing request 52 and creates a bandwidth-sensing response. The bandwidth-sensing response is sent back across the radio link 50 via the radio interface 60 of the fixed node 80, shown as step 54 to an IP address associated with the mobile station 78. The bandwidth-sensing response 54 is then received via the radio interface 58 of the mobile station 78 and passed to the bandwidth-sensing agent 62 in the data processing part 76 of the mobile station 78.

The bandwidth-sensing agent 62 in the mobile station 78 logs and processes the bandwidth-sensing response 54 and uses the time difference between the transmittal of the bandwidth-sensing request 52 and the reception of the bandwidth-sensing response 54 to calculate a transit time for the journey across the radio link. This transit time is encapsulated in a bandwidth report which is delivered to a control node 74. This delivery involves sending the report back across the radio link to the fixed node, shown in step 56, via the mobile station and fixed node radio interfaces 58, 60 and then via the network interface 70 in the fixed node. At the control node 74 the transit time contained in the report can be translated into an indication of available bandwidth.

The bandwidth report 56 may also contain information to identify which mobile station the report originated in such as the user identity or other such information. The bandwidth report may contain merely the timing information, leaving all calculations to be carried out at the control node.

This embodiment requires less network processing capacity than the fixed node based embodiment described later, as it places much of the processing responsibility upon each mobile station. This embodiment does, however, involve three exchanges of packets across the radio link; the bandwidth-sensing request; the bandwidth-sensing response and finally the bandwidth reporting, whereas the fixed node based embodiment requires only two such exchanges.

A mechanism exists for querying the correct IP address for where the bandwidth-sensing responder is located in order that the bandwidth-sensing request is sent to the correct place in the network i.e. the IP address of the fixed node. The mechanism will also have the facility to query the IP address for where the bandwidth-sensing response is sent back to i.e. the IP address of the mobile station. This mechanism will also deal with the updating of the mobile station IP address, for example due to a handover event. This mechanism can take the form of an IP address advertisement from the fixed node or could use a native addressing scheme, e.g. GSM node address, and translate this to an IP address by way of a GSM to IP address translator within the terminal. The GSM to IP address translator may use a lookup table within or remote from the terminal.

Fixed Node Based Monitoring

Figure 3:
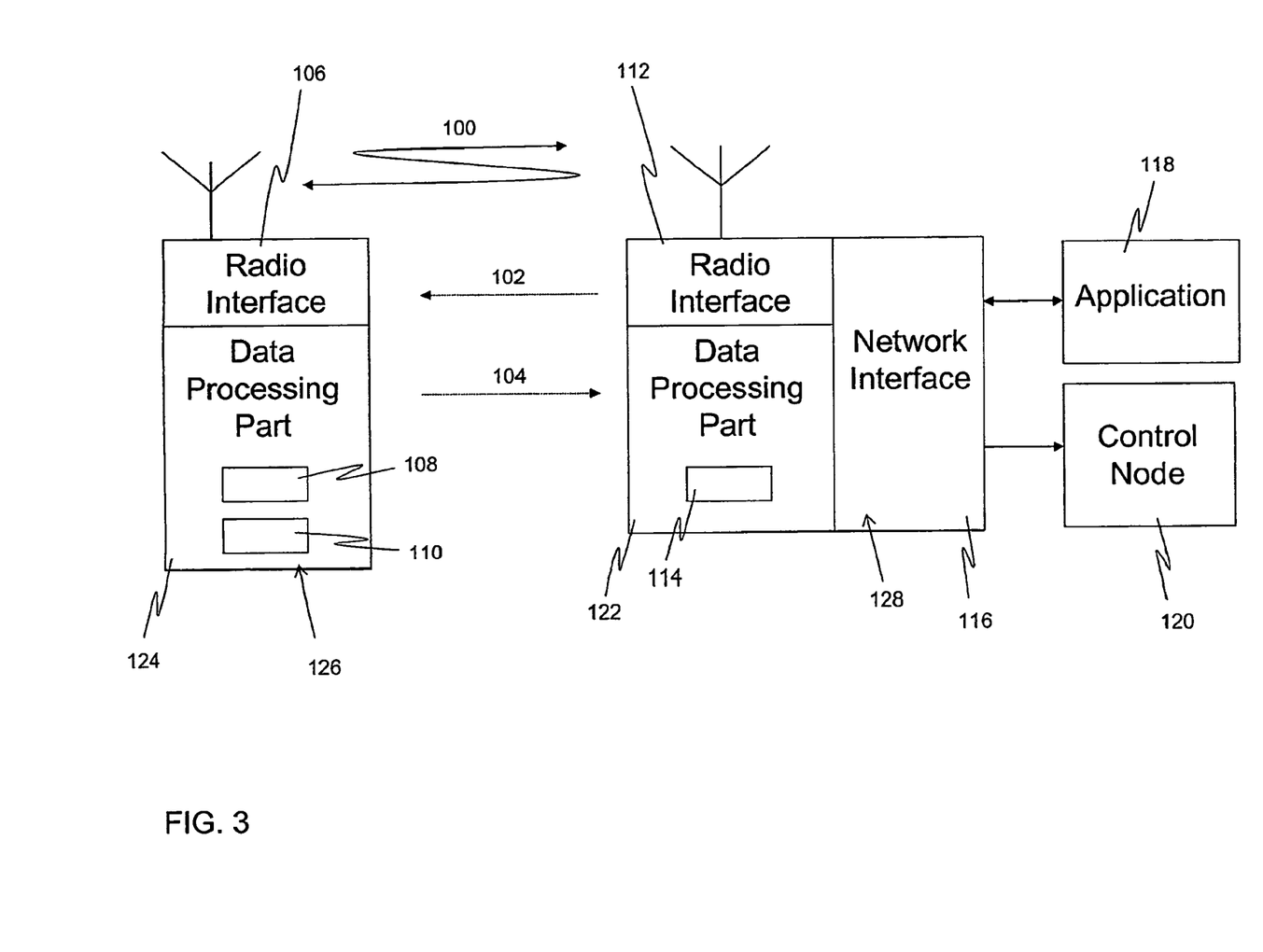
FIG. 3 is a diagram of the fixed node based monitoring configuration according to an embodiment of the invention.

FIG. 3 shows a schematic of the process for this approach, where a mobile station 126 with a radio interface 106 and a fixed node 128 with a radio interface 112 communicate via a radio link 100. The fixed node 128 has access to an application 118 via a network interface 116. The mobile station 126 incorporates an application 110 running in a data processing part 124.

A bandwidth-sensing request, shown as step 102, originating from a bandwidth-sensing agent 114 contained in a data processing part 122 of the fixed node 128 is transmitted via the fixed node radio interface 112 across the radio link 100 to an IP address associated with the mobile station 126. This bandwidth-sensing request 102 is received via the radio interface 106 of the mobile station 126 and passed to a data processing part 124 contain therein. The data processing part in the mobile station 124 contains a bandwidth-sensing responder 108 which processes this request and creates a bandwidth-sensing response. The bandwidth-sensing response is sent back across the radio link 100 via the mobile station radio interface 106, shown as step 104 to an IP address associated with the fixed node. The bandwidth-sensing response 104 is then received via the radio interface 112 of the fixed node 128 and passed to the bandwidth-sensing agent 114 in the fixed node data processing part 122. The bandwidth-sensing agent 114 in the fixed node 128 logs and processes the bandwidth-sensing response 104 and uses the time difference between the transmittal of the bandwidth-sensing request 102 and the reception of the bandwidth-sensing response 104 to calculate a transit time for the journey across the radio link. This transit time is encapsulated in a bandwidth report along with the user identity which is delivered to a control node 120 via a network interface 116, where the transit time contained in the report can be translated into an indication of available bandwidth for the user.

Again, as with the mobile station based approach, the bandwidth report may contain merely the timing information, leaving all calculations to be carried out at the control node.

The transit time can be translated into an indication of available bandwidth either at the fixed node 128 or at the control node 120. Here, as well as containing information identifying which mobile station the bandwidth-sensing response 104 came from, the report may contain information indicating the status of the mobile station. As the fixed node is responsible for originating the bandwidth-sensing request each fixed node needs to know which terminals are in its location area, this status can be updated by paging or registration.

One advantage of this approach over the mobile station based approach is that only two exchanges of information are made; the bandwidth-sensing request and bandwidth-sensing response. It is also less susceptible to spoofing as the IP addresses used are under the control of a network entity.

Similarly to the mobile station based embodiment, a mechanism for querying IP addresses exists for this embodiment. The fixed node needs to know the IP address for every active mobile station in its area and also relate this to the user identities for whom the monitoring is being performed. The details may be obtained by querying a different entity in the network for which these details are known, for example the HLR.

Bandwidth-Sensing Mechanism

Figure 4:
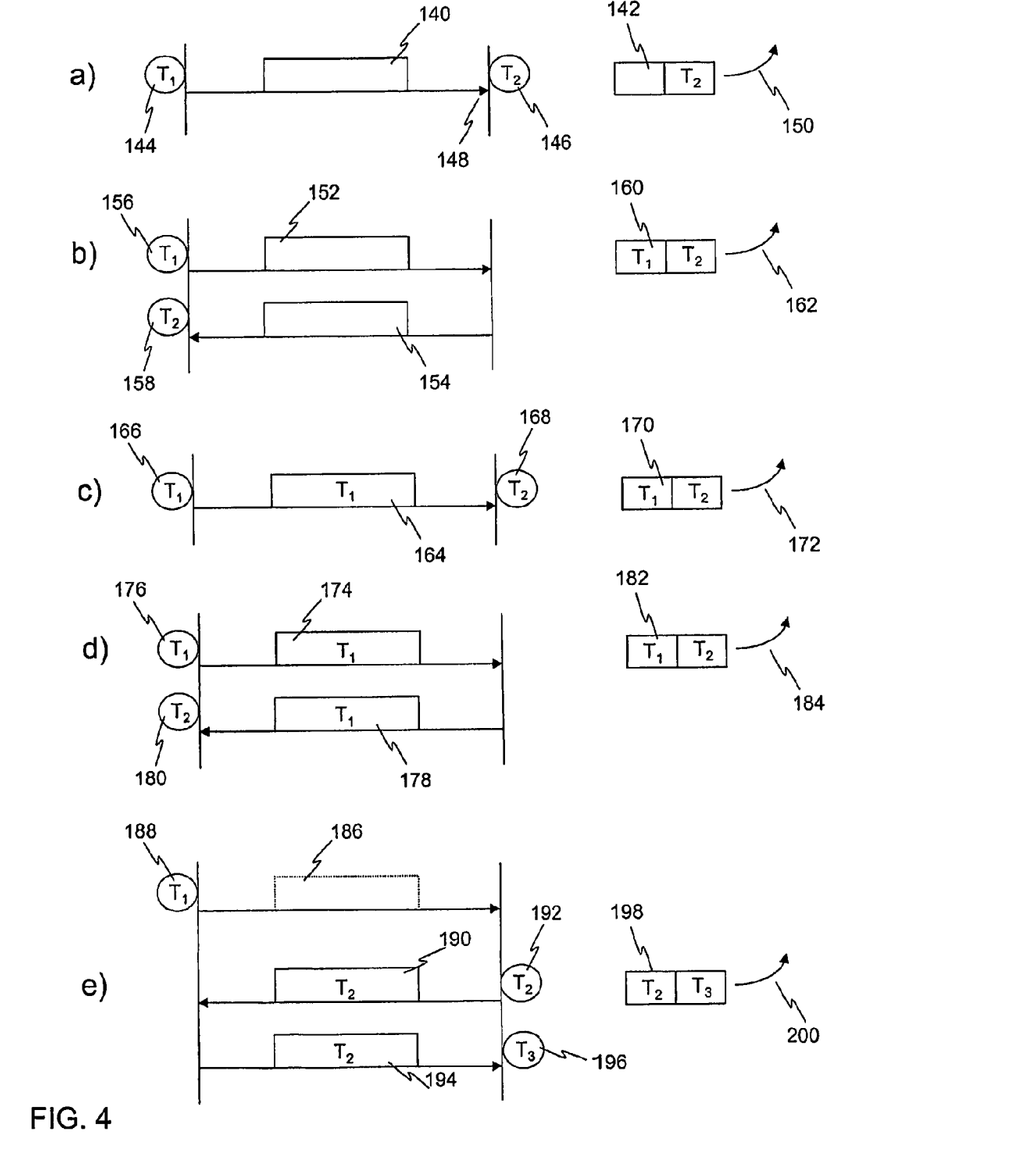
FIG. 4 is a diagram showing various bandwidth-sensing structures according to embodiments of the invention.

A number of possible embodiments of the bandwidth-sensing mechanism are shown graphically in FIG. 4. Each embodiment may be initiated at a mobile station or a fixed node, depending on whether the mobile station or fixed node based monitoring is used.

A first embodiment (FIG. 4a) depicts the transmittal and reception of a bandwidth-sensing data packet 140 across the radio link, from one point in the network to another, denoted by the direction of the arrow 148. The data packet 140 is transmitted at a time T1, shown by item 144, and received at a time T2, shown by item 146.

The only timing information immediately available at the side of the radio link where the data packet 140 is received is the time T2. The calculation for the transit time of the data packet for this embodiment thus relies on further knowledge of time T1. This may be known, for example as the data packets used for the bandwidth-sensing mechanism are sent at regular predetermined intervals or after certain network events, whereby the time T1 can be otherwise ascertained at the control node or elsewhere in the network. A bandwidth report 142 is sent to the control node, shown by the arrow of item 150, where it can be translated into a measure of the available bandwidth. This bandwidth report can be seen to only include the time T2.

A second embodiment (FIG. 4b) depicts the transmittal of a first bandwidth-sensing data packet 152 at a time T1, shown by item 156. The time T1 is stored at the originating point of the first data packet 152. The first data packet 152 is received at another point in the network and in response a further bandwidth-sensing data packet 154 is then transmitted back across the network to the originating point of the first bandwidth-sensing data packet. The further bandwidth-sensing data packet may be different to the first bandwidth-sensing data packet or may simply be the first bandwidth-sensing data packet retransmitted.

The further bandwidth-sensing data packet 154 is received at the originating point of the first bandwidth-sensing data packet in the network at time T2, shown by item 158. Here, the times T1 and T2 are immediately available at the same side of the radio link and are included in the bandwidth report 160 which is sent to the control node in step 162.

A third embodiment (FIG. 4c) depicts the transmittal of a bandwidth-sensing data packet 164 at time T1, shown by item 166, with the transmittal time T1 encapsulated inside. The bandwidth-sensing data packet 164 is received at another point in the network at time T2, shown by item 168. The times T1 and T2 are thus immediately available at the same side of the radio link to be included in the bandwidth report 170 that is sent to the control node in step 172.

A fourth embodiment (FIG. 4d) depicts the transmittal of a first bandwidth-sensing data packet 174 in which the transmittal time T1, shown by item 176, is encapsulated. The same bandwidth-sensing data packet is received at a different point in the network and either the same bandwidth-sensing data packet 178 is retransmitted back across the radio link to be received at the originating point of the first bandwidth-sensing data packet at time T2, shown by item 180, or alternatively another bandwidth-sensing data packet 178 is transmitted back across the radio link with the time T1 encapsulated inside it. Times T1 and T2 are immediately known at the originating point of the first bandwidth-sensing data packet 174, so can both be used in the bandwidth report 182 that is sent to the control node from this point, shown by step 184.

An advantage of this embodiment is that the transmittal time does not need to be stored at the originating point of the first bandwidth-sensing data packet. If the originating point is the mobile station, this could be a useful feature where memory can be a scarce and expensive resource.

A fifth embodiment (FIG. 4e) depicts the use of a "wake-up" or "sync" bandwidth-sensing data packet 186 which is used to request the start of a bandwidth-sensing sequence. This sync bandwidth-sensing data packet 186 is transmitted across the radio link at a time T1, shown as item 188. In response to receiving the sync bandwidth-sensing data packet 186, a further data packet 190 is transmitted back across the radio link at time T2, shown by item 192. The time T2 is encapsulated inside the further bandwidth-sensing data packet. The further bandwidth-sensing data packet is then received at the originating point of the sync bandwidth-sensing data packet and either the same bandwidth-sensing data packet 194 is retransmitted back across the radio link to be received at its originating point or alternatively a still further bandwidth-sensing data packet 194 is retransmitted back across the radio link with the time T2 encapsulated inside it.

The still further bandwidth-sensing data packet 194 is received at the originating point of the further bandwidth-sensing data packet at time T3, shown as item 196. The bandwidth report 198 seat to the control node in step 200 then contains the times T2 and T3 as these are immediately available at the same side of the radio link. A variation to the fifth embodiment would be where no encapsulation is carried out, but the time T2 is stored at the point of transmittal of the further bandwidth-sensing data packet and subsequently retrieved from memory to be added to the bandwidth report that is sent to the control node.

Service Management

Figure 5:
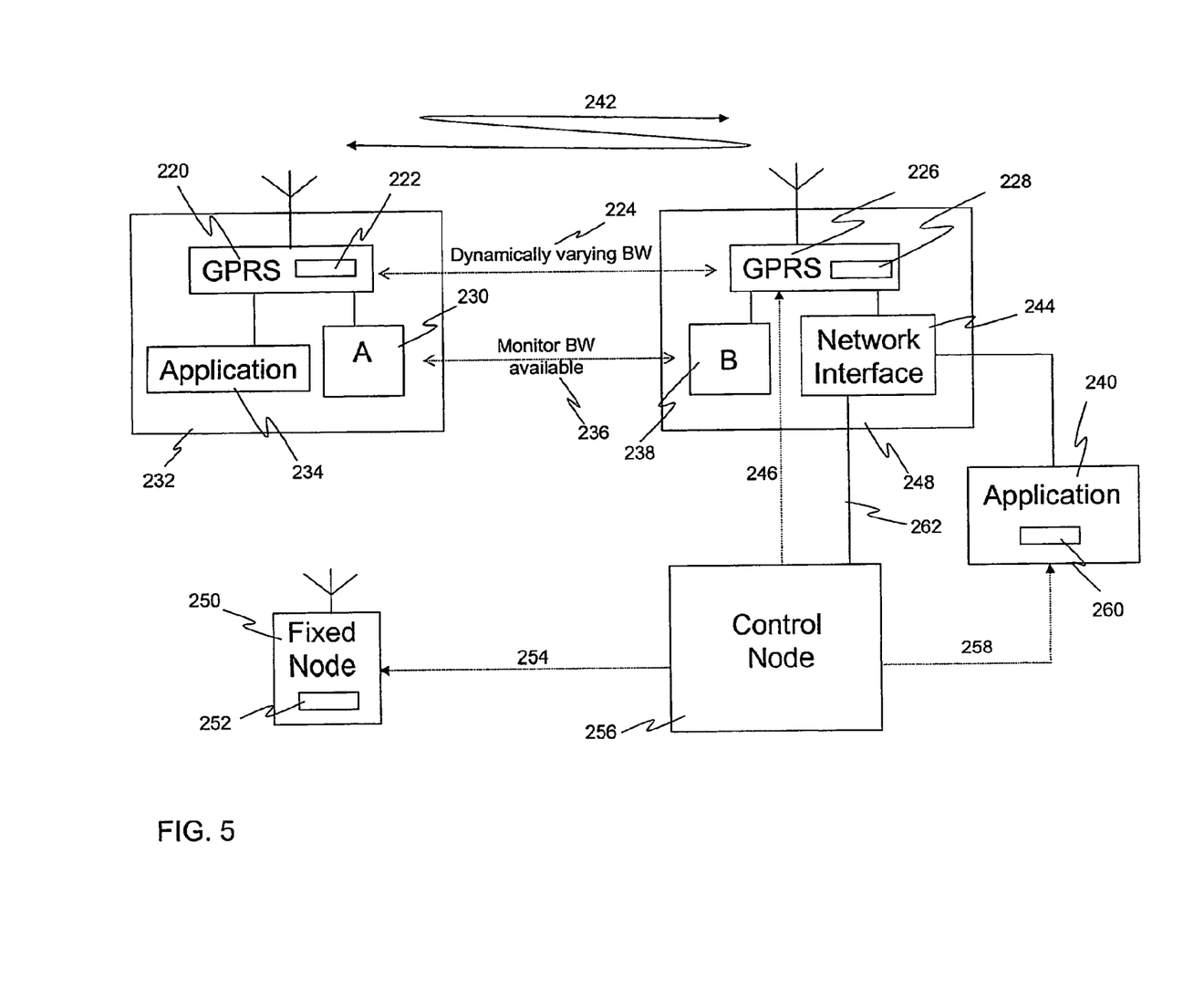
FIG. 5 shows an embodiment of the present invention where the packet-based network is a GPRS network.

A bandwidth report which is generated as described above may be used to control or manage the characteristics of a service which includes the transmission of data in the form of service data packets passing to and from a mobile station across a radio link. FIG. 5 shows an embodiment of the present invention where the example packet-based, network is a GPRS network. A mobile station 232 has a radio link 242 with a fixed node 248 through which a packet-based service is provided. The bandwidth of this radio link will vary dynamically 224 depending on a number of factors including network load, atmospheric conditions, user movement etc. A service is provided by an application 240, which may be hosted locally at the fixed node or remotely at another network node e.g. by a server of an internet service provider.

The application 240 has a data processing function 260 for controlling various attributes of the service such as data rate and content. Service data is provided via a network interface 244 in the fixed node to a GPRS module 226 in the fixed node and on to a GPRS module 220 in the mobile station. The data is used by the application software 234 running on the mobile station 232.

The mobile station 232 and fixed node 248 also contain bandwidth-sensing modules A and B, shown as items 230 and 238 respectively. These modules will be either bandwidth-sensing agents or bandwidth-sensing responders depending on whether mobile station or fixed node based monitoring is employed.

The fixed node GPRS module 226 is also connected to a control node 256 by a communications link 262 via the network interface 244. The bandwidth-sensing mechanism used to calculate the bandwidth available to the provided service will depend on which of mobile station or fixed node based monitoring is used. The communications link 262 could possibly include further network nodes.

If a bandwidth report indicates a decrease in available bandwidth compared to a previous report, it may be desirable to lower the data rate of the service being provided by the application 240. This might be for example, if it is no longer possible to provide a full video service and the perceived QoS would be better with a lower frame rate and continue with this degraded service rather than running a poor quality full video service. If this is the case, the control node 256 will request, shown as step 258, the provider of the application 240 to lower the current data rate by a standard amount or by a particular amount requested. The data processing function 260 of the application 240 will process this request and if possible, alter the service provided to the fixed node GPRS module 226 via the network interface 244 accordingly. In this way, the data rate of the service received by the mobile station 232 will be more suited to the current capabilities of the radio link it is received over, hence giving an improved level of QoS for the service.

If a bandwidth report indicates an increase in available bandwidth compared to a previous report, it may be desirable to increase the data rate of the service being provided by the application 240. The above steps for a decrease in the data rate may be carried out in a similar fashion, but with the end result being an increase in the data rate of the service. This may occur, for example once a radio link being used to provide low data rate video has regained sufficient availability to provide high data rate video once again. The GPRS modules in the mobile station and the fixed node, shown by items 220 and 226 respectively, contain bandwidth control functions, shown by items 222 and 228 respectively, to negotiate bandwidth for the service between them. The application running in the mobile station 234 requests data from the GPRS module 220, which in turn receives data across the radio link from the fixed node GPRS module 226. If the negotiation does not result in a high enough flow of data to the application, this information can be relayed to the control node 256 in the form of a bandwidth report sent via the network interface 244 and communications link 262. The control node can then request, shown as step 246, the fixed node GPRS module to instruct its bandwidth control function to increase the bandwidth of the radio link with the mobile station if possible.

In addition, the control node is connected to a fixed node 250 responsible for processing handover requests. The fixed node 250 has a handover control function 252 for processing the handover of the service received by the mobile station to another fixed node. If the mobile station 232 is not able to receive a certain level of QoS through its current radio link, it may be able to do so through another radio link i.e. by handover to another fixed node. This may arise, for example after a failed request to the existing fixed node to increase the bandwidth of the current radio link. If this is the case, the control node 256 instructs the handover control function 252 to handover the mobile station 232, as shown in step 254, to another fixed node.

The above embodiments are to be understood as illustrative examples of the invention. Further embodiments of the invention are envisaged.

Referring again to FIG. 1, one variation on this system may include systems where the application 14 connects directly to the GGSN 10 instead of via the packet network 16. Another variation may be where the SGSN 8, 22 and the GGSN 10 functionalities are combined into the same physical node, or other such combinations.

In the above embodiments, the bandwidth-sensing mechanism is performed to/from a network node in the form of a base station. The bandwidth-sensing mechanism could alternatively be performed to/from a different network node such as the GGSN for the GPRS access network. The bandwidth reports could then be sent to a control node inside or outside the network whose IP address is also known and predetermined. Further alternatively, the bandwidth-sensing mechanism could alternatively be performed to/from the control node itself. Such mechanisms, rather than characterizing the radio link itself, give a bandwidth indication from a system perspective.

The embodiments shown in FIG. 4 are to be taken as examples of some formats that the structure of the bandwidth-sensing mechanism could take. An alternative to the bandwidth report structure described in relation to FIG. 4 is where only the time difference between T1 and T2 is sent in the bandwidth report, instead of the time T1 and T2 themselves. The bandwidth reports could be split into parts, so that as soon as one piece of timing information becomes available, for example a transmittal time becomes known, this information can be sent to the control node. Further variations are envisaged, for example a number of round-trips of data packets could be monitored and an average taken of the transit times. Other variations may include a data packet being transmitted from a first point in the network, received at a second point, then a further data packet being retransmitted from a third point in the network back to the first point, in order to arrive at a transit time for the radio link.

While in the above description, the invention has been described in the context of apparatus for use in a mobile station, fixed node and a control node adapted to perform the functions of the invention, the invention also relates to computer software for running in such apparatus, which is adapted to perform the functions of the invention.

The above description generally refers to the invention in context to second generation GPRS technology, but the present invention could equally be employed alongside other packet radio access technologies such as third generation GPRS technology, and indeed to other third generation or fourth generation technologies. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of providing service in a mobile communications network, the method comprising:
    creating bandwidth-sensing data packets; the bandwidth-sensing data packets being created for the purpose of determining changes in the bandwidth available across a radio communications link having a dynamically varying bandwidth;
    monitoring transmissions across the radio communications link to determine changes in the bandwidth available across the radio communications link, the monitored transmissions including at least the transmission of a given bandwidth-sensing data packet;
    generating information relating to the monitored transmissions wherein the generated information is timing information for the monitored transmissions; and
    in response to the generated information indicating a change in the bandwidth along the radio communications link, controlling one or more characteristics of the service received in the mobile communications network by altering said one or more characteristics of the service,
    wherein the service comprises service data packets being sent from and/or to a mobile station.

2. The method of claim 1, wherein the bandwidth-sensing data packets are sent using a higher priority than the service data packets.

3. The method of claim 1, wherein the bandwidth-sensing data packets include bandwidth-sensing data packets sent from an originating node to the mobile station.

4. The method of claim 3, wherein the bandwidth-sensing data packets sent from the originating node to the mobile station are created in a different originating node than service data packets which are sent to the mobile station.

5. The method of claim 1, wherein the bandwidth-sensing data packets include bandwidth-sensing data packets sent from the mobile station.

6. The method of claim 5, wherein the bandwidth-sensing data packets sent from the mobile station are sent to a different destination node than the service data packets which are sent from the mobile station.

7. The method of claim 1, further comprising:
receiving the given bandwidth-sensing data packet across the link;
in response to receiving the given bandwidth-sensing data packet, generating timing information indicating a transit delay for at least the given bandwidth-sensing data packet.

8. The method of claim 7, wherein the transit delay relates to a transit involving at least a round-trip across the link.

9. The method of claim 1, comprising using the arrival time of a bandwidth-sensing data packet in the generation of the timing information.

10. The method of claim 1, comprising using the transmittal time of a bandwidth-sensing data packet in the generation of the timing information.

11. The method of claim 10, further comprising:
encapsulating the transmittal time into at least the given bandwidth-sensing data packet;
using the encapsulated transmittal time in the generation of the timing information.

12. The method of claim 1, wherein the monitored transmissions include at least the transmission of a first bandwidth-sensing data packet and the transmission of a second bandwidth-sensing data packet, the method further comprising transmitting the second bandwidth-sensing data packet across the link in response to the receipt of the first bandwidth-sensing data packet across the link.

13. The method of claim 12, further comprising
encapsulating the transmittal time into both the first bandwidth-sensing data packet and the second bandwidth-sensing data packet.

14. The method of claim 1, wherein the method includes a transmission scheduling process which schedules the transmittal of bandwidth-sensing data packets across the link in accordance with a predetermined schedule.

15. The method of claim 14, wherein the method includes storing the predetermined schedule and generating the timing information by reference to the stored schedule.

16. The method of claim 1, wherein the monitored transmissions include at least an initial bandwidth-sensing data packet, the initial bandwidth-sensing data packet being transmitted from a mobile station.

17. The method of claim 1, wherein the monitored transmissions include at least an initial bandwidth-sensing data packet, the initial bandwidth-sensing data packet being transmitted from a fixed node.

18. The method of claim 1, wherein the service data packets are provided at least in part by a data processing function and the alteration involves altering a data rate of the service data packets.

19. The method of claim 1, wherein the service is provided at least in part by a bandwidth control function and the alteration involves instructing the bandwidth control function to alter the bandwidth available across the link.

20. The method of claim 1, wherein the service is provided at least in part by a handover control function and the alteration involves instructing the handover control function to control a handover of the radio communications link from one fixed node to another fixed node.

21. The method of claim 19, wherein the radio communications link is a General Packet Radio Service (GPRS) link.

22. The method of claim 21, wherein the GPRS link is provided by a GPRS module in a fixed node, and wherein the bandwidth control function is incorporated in the GPRS module.

23. The method of claim 1, wherein the mobile communications network includes a control node for processing the timing information, and for, in response to the processing of the timing information, controlling the alteration of the one or more characteristics.

24. The method of claim 23, wherein the control node is configured to control one or more characteristics of services received by a plurality of mobile stations.

25. The method of claim 24, wherein the plurality of mobile stations is served by a plurality of fixed nodes.

26. The method of claim 24, wherein the plurality of mobile stations is configured to process the timing information.

27. A system configured to perform the method of claim 1.

28. A mobile station configured to perform a method of controlling one or more characteristics of a service received by the mobile station in a mobile communications network across a radio communications link with a dynamically varying bandwidth, the method comprising:
creating bandwidth-sensing data packets;
monitoring transmissions of the bandwidth-sensing data packets across the radio communications link to determine changes in the bandwidth available across the radio communications link, the monitored transmissions including at least the transmission of a given bandwidth-sensing data packet;
generating timing information for the monitored transmissions; and
in response to the timing information indicating a change in the bandwidth, controlling one or more characteristics of the service received in the mobile communications network by altering said one or more characteristics,
wherein the mobile station is further configured to control said one or more characteristics of the service received by the mobile station by creating the bandwidth-sensing data packets, monitoring transmissions of the bandwidth-sensing data packets across the link, and generating timing information for the monitored transmissions.

29. A system for use in a fixed node of a mobile communications network, the system being configured to perform a method of controlling one or more characteristics of a service received by a mobile station in a mobile communications network across a radio communications link with a dynamically varying bandwidth, the method comprising:
creating bandwidth-sensing data packets:
monitoring transmissions of the bandwidth-sensing data packets across the link to determine changes in the bandwidth available across the radio communications link, the monitored transmissions including at least the transmission of a given bandwidth-sensing data packet;
generating timing information for the monitored transmissions; and in response to the timing information indicating a change in the bandwidth, controlling one or more characteristics of the service received in the mobile communications network by altering said one or more characteristics,
wherein the fixed node system is configured to perform the creation of the bandwidth-sensing data packets and/or the monitoring of transmissions of the bandwidth-sensing data packets across the link and/or the generation of timing information for the monitored transmissions.

30. A system for use in a control node of a mobile communications network, the system configured to perform a method of controlling one or more characteristics of a service received by a mobile station in a mobile communications network across a radio communications link with a dynamically varying bandwidth, the method comprising:
creating bandwidth-sensing data packets;
monitoring transmissions of the bandwidth-sensing data packets across the radio communications link to determine changes in the bandwidth available across the radio communications link, the monitored transmissions including at least the transmission of a given bandwidth-sensing data packet;
generating timing information for the monitored transmissions; and
in response to the timing information indicating a change in the bandwidth, controlling one or more characteristics of the service received in the mobile communications network by altering said one or more characteristics,
wherein the control node system is adapted to perform the monitoring of transmissions of the bandwidth-sensing data packets across the link and/or the generation of timing information for the monitored transmissions and/or the alteration of the one or more characteristics of the service received in the mobile communications network.

31. A non-transitory computer-readable medium having computer-executable instructions stored thereon, which when executed cause a fixed node of a mobile communications network, to perform a method of controlling one or more characteristics of a service received by a mobile station in a mobile communications network across a radio communications link with a dynamically varying bandwidth, the method comprising:
creating bandwidth-sensing data packets;
monitoring transmissions of the bandwidth-sensing data packets across the radio communications link to determine changes in the bandwidth available across the radio communications link, the monitored transmissions including at least the transmission of a given bandwidth-sensing data packet;
generating timing information for the monitored transmissions; and in response to the timing information indicating a change in the bandwidth, controlling one or more characteristics of the service received in the mobile communications network by altering said one or more characteristics,
wherein the fixed node is configured to perform the creation of the bandwidth-sensing data packets and/or the monitoring of transmissions of the bandwidth-sensing data packets across the link and/or the generation of timing information for the monitored transmissions.

32. A non-transitory computer-readable medium having computer-executable instructions stored thereon, which when executed cause a control node of a mobile communications network to perform a method of controlling one or more characteristics of a service received by a mobile station in a mobile communications network across a radio communications link with a dynamically varying bandwidth, the method comprising:
creating bandwidth-sensing data packets;
monitoring transmissions of the bandwidth-sensing data packets across the radio communications link to determine changes in the bandwidth available across the radio communications link, the monitored transmissions including at least the transmission of a given bandwidth-sensing data packet;
generating timing information for the monitored transmissions; and in response to the timing information indicating a change in the bandwidth, controlling one or more characteristics of the service received in the mobile communications network by altering said one or more characteristics,
wherein the control node is configured to perform the monitoring of transmissions of the bandwidth-sensing data packets across the radio communications link and/or the generation of timing information for the monitored transmissions and/or the alteration of the one or more characteristics of the service received in the mobile communications network.

33. A method of controlling one or more characteristics of a service received by a mobile station in a mobile communications network across a radio communications link with a dynamically varying bandwidth, the method comprising:
monitoring transmissions of data packets across the radio communications link, the monitored transmissions including at least the transmission of a given data packet;
generating timing information for the monitored transmissions; and
in response to the timing information indicating a change in the bandwidth, controlling one or more characteristics of the service received in the mobile communications network by altering said one or more characteristics,
wherein the service is provided at least in part by one or more radio resource control functions and the alteration involves altering radio resources in the service received by the mobile station, under the control of the one or more radio resource control functions.

34. The method of claim 33, wherein the alteration involves instructing a bandwidth control function to alter the bandwidth available across the link.

35. The method of claim 33, wherein the alteration involves instructing a handover control function to control a handover of the radio communications link from one fixed node to another fixed node.

* * * * *